United States Patent [19]
Caray et al.

[11] Patent Number: 4,570,775
[45] Date of Patent: Feb. 18, 1986

[54] CLUTCH PLATE ASSEMBLY WITH IMPROVED COUPLING BETWEEN A HUB AND A FRICTION DISC THEREOF

[75] Inventors: André Caray, Paris; Pierre Renaud, Le Plessis-Trevise, both of France

[73] Assignee: Valeo, Paris, France

[21] Appl. No.: 428,602

[22] Filed: Sep. 30, 1982

[30] Foreign Application Priority Data

Oct. 14, 1981 [FR] France ................................ 81 19298

[51] Int. Cl.⁴ ............................................... F16D 3/66
[52] U.S. Cl. .............................. 192/106.2; 192/106.1; 464/64; 464/68
[58] Field of Search ............... 192/106.2, 106.1, 70.17; 464/64, 65, 66, 67, 68

[56] References Cited

U.S. PATENT DOCUMENTS 2,284,278  5/1942  Goodwin ........................ 192/106.2
4,223,776  9/1980  Berlioux ......................... 192/106.2

FOREIGN PATENT DOCUMENTS 2405814   8/1974  Fed. Rep. of Germany ... 192/106.2
2814059  10/1978  Fed. Rep. of Germany ... 192/106.2
2183390  12/1973  France .
2361574   4/1978  France ............................. 192/106.2
2412002   8/1979  France ............................. 192/106.2

Primary Examiner—Rodney H. Bonck
Attorney, Agent, or Firm—Charles E. Brown; Charles A. Brown

[57] ABSTRACT

A clutch plate assembly is disclosed comprising two coaxial parts mounted for relative rotation within a predetermined range of angular displacement against the action of springs. One coaxial part comprises a hub flange and the other coaxial part comprises two annular guide members. An axial ring is fixed to the first annular guide member and circumferentially spaced tenons secure the second annular guide member to the axial ring through notches in the latter. The hub flange has circumferentially spaced radial lugs received with clearance in recesses in the axial ring. The recesses and notches in the axial ring are circumferentially offset relative to one another. The free edge of the axial ring axially closes off the recesses.

10 Claims, 11 Drawing Figures

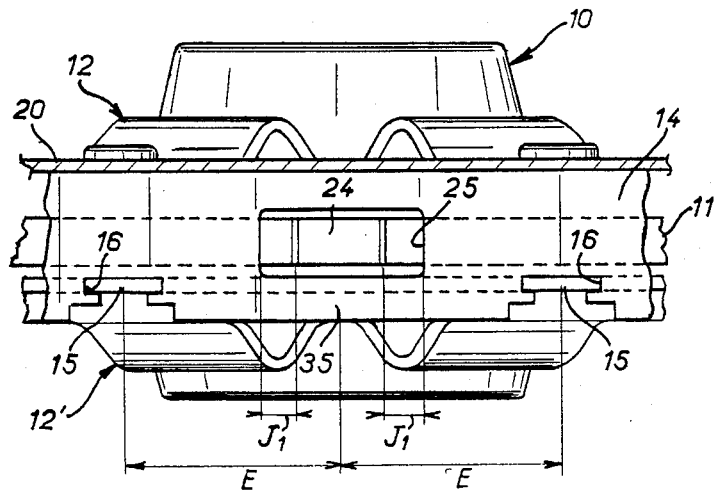
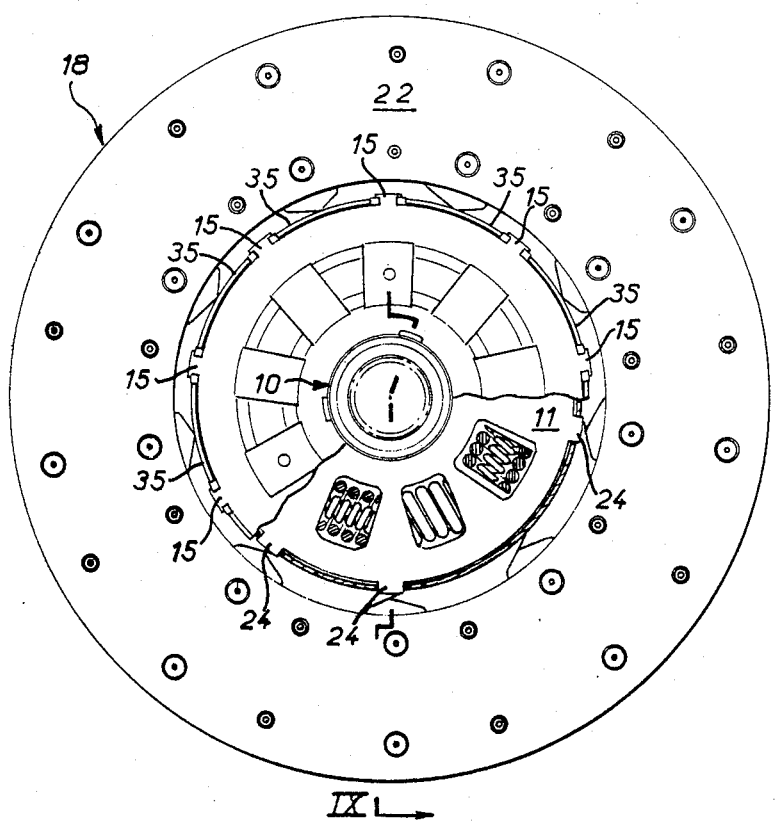
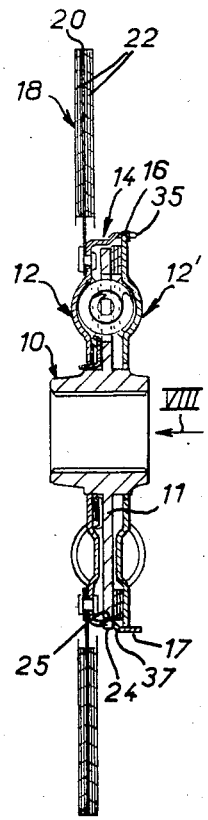

CLUTCH PLATE ASSEMBLY WITH IMPROVED COUPLING BETWEEN A HUB AND A FRICTION DISC THEREOF

The present invention relates generally to clutch plate assemblies or driven discs, that is the part of an automotive friction clutch which comprises a disc fixed rotation with a shaft, in practice the driven shaft, and having facings along its periphery. The disc is adapted to be resiliently clamped by its friction facings between two plates which are fixed for rotation with the other or driving shaft, one of the plates called the pressure plate being mounted for axial movement relative to the other plate called the reaction plate or flywheel. The present invention relates more particularly to such friction clutches which have a so-called torsion damping center or assembly.

As is known, such a clutch plate generally comprises at least two coaxial parts mounted for relative rotation within a predetermined range of angular displacement against the action of resilient means. For example, the first coaxial part comprises a hub flange and the second part comprises two annular guide members or washers on axially opposite sides of the hub flange. The hub flange comprises openings of closed or open contour for accommodating the associated resilient means. One of the coaxial parts is fixed for rotation with the hub and the other of the coaxial parts is fixed for rotation with the disc having friction facings or linings.

Such a clutch plate assembly having a torsion damping assembly is used, namely, for suitable filtering of vibrations which develop along the kinematic chain of a motor vehicle which runs between the output shaft of the engine and the wheel axles. In practice, the two annular guide members of the clutch plate assembly are fixed for rotation with each other.

The present invention is more particularly related to the case where a first annular guide member is fixed to an axial ring, whether or not in one piece therewith, the axial ring extending radially outwardly beyond the hub flange, and the second annular guide member has circumferentially spaced spaced radial tenons along its periphery. The tenons on the second annular guide member are engaged and crimped in notches in the axial ring. Such an arrangement is disclosed in U.S. Pat. No. 4,223,776 assigned to the assignee of the present application.

Most often the resilient means opposing relative angular displacement of the coaxial parts of such a clutch plate assembly comprise substantially chordal coil springs. The ultimate range of relative angular displacement of the coaxial parts is determined by engagement of the adjacent turns of at least some of the coil springs.

Inevitably there is a certain limitation on the maximum transmissible torque between the coaxial parts. When the torque is transmitted through the coil springs with their turns in engagement with one another, the stress due to compression is added to the resilient stresses due to torsion and the coil springs are under their maximum loading.

To avoid this limitation, which is desirable for truck clutch plate assemblies having torsion damping centers to permit the transfer of excess torque from one coaxial part to the other in the position of maximum relative angular displacement, it has been proposed to provide along the periphery of the hub flange radial lugs normally received with clearance in recesses in the axial ring fixed to one of the annular guide rings. Such an arrangement is disclosed in French Pat. No. 72 16111 in the name of the assignee of the present application.

It has been contemplated to transpose this arrangement to the case of a clutch plate assembly in which, as mentioned above, the axial ring has notches for receiving radial tenons at the periphery of the annular guide member to be fixed thereto. This transposed arrangement quite naturally leads to forming the notch as an enlarged portion of the recess for receiving the lug on the hub flange, such a recess opening axially into the endwall of the notch.

Such an arrangement has a dual drawback. First of all, in line with each recess in continuity with a notch, the axial ring is considerably weakened. Such a weakening of the axial ring all the more jeopardizes the axial ring since at least part of the torque transmitted is transmitted in line with the recess as the notch serves to accommodate the tenon on the annular guide member. It is not uncommon to find the formation of cracks or fractures in the axial ring extending from the corner zones of each of the recesses. In addition, by reason of the presence of such a recess, the notch provided for a tenon on the annular guide member for securement with the axial ring is circumferentially wider than what is absolutely necessary for securement and for the transmission of the corresponding torque. The result is that the annular guide member must have tenons of different circumferential widths depending on whether the tenons are to be received in notches into which recesses open or not, thereby complicating the manufacture and the assembly of such an annular guide member. Also, the crimping of the circumferentially wider tenons of the annular guide member cannot be carried out under the best of conditions and this is prejudical to mechanical strength thereof.

A general object of the invention is to provide an arrangement which avoids the foregoing drawbacks.

According to the invention there is provided a clutch plate assembly for motor vehicles, said clutch plate assembly comprising two coaxial parts mounted for relative rotation within a predetermined range of angular displacement against the action of resilient means, one of said coaxial parts comprising a hub flange and the second coaxial part comprising two annular guide members disposed on axially opposite sides of the hub flange, an axial ring fixed to the periphery of a first of said guide members and disposed radially outwardly of said hub flange, the second of said guide members having circumferentially spaced tenons engaged and crimped in notches in said axial ring, said hub flange having along its periphery circumferentially spaced lugs normally received with clearance in recesses in said axial ring, characterized in that said recesses in said axial ring are circumferentially offset relative to said notches therein.

This results in an advantageous distribution of the recesses and notches in the axial ring, since none of the recesses opens axially into any of the notches. On the contrary, each of the recesses is advantageously of closed contour, at least a part of the free edge of the axial ring forming for such a recess a rim which ensures the continuity of the contour thereof.

Further, the resistance to torque transmitted by the axial ring is advantageously enhanced.

Moreover, the second annular guide member may be provided with tenons all having the same circumferential width. The manufacture and assembly of the clutch plate assembly is therefore simplified and the crimping of the tenons may all be carried out under good conditions, on account of the appropriate circumferential width thereof, and its service life is also advantageously increased.

Preferably, to facilitate assembly of the second annular guide member on the axial ring, in circumferential alignment with each of the recesses in the axial ring, the free edge thereof extends, at least locally, along a circumference having a diameter greater than that of the circumference along which its main part extends, the free edge being radially offset relative to the main part. For example, the free edge of the axial ring is radially offset with respect to the main part thereof only in circumferential alignment with the recesses provided for receiving the lugs in the hub flange. Alternatively the free edge of the axial ring may be radially offset in relation to the main part thereof along the entire axial ring.

The features and advantages of the invention will be brought out in the description which follows, given by way of example, with reference to the accompanying diagrammatic drawings, wherein:

FIG. 5 shows, on the same scale as FIGS. 3 and 4, and viewed flat, sectional view of the clutch plate assembly taken along line V—V in FIG. 1;

FIGS. 8-11, respectively, are views similar to those of FIGS. 1-4 relative to another embodiment.

Figure 1:
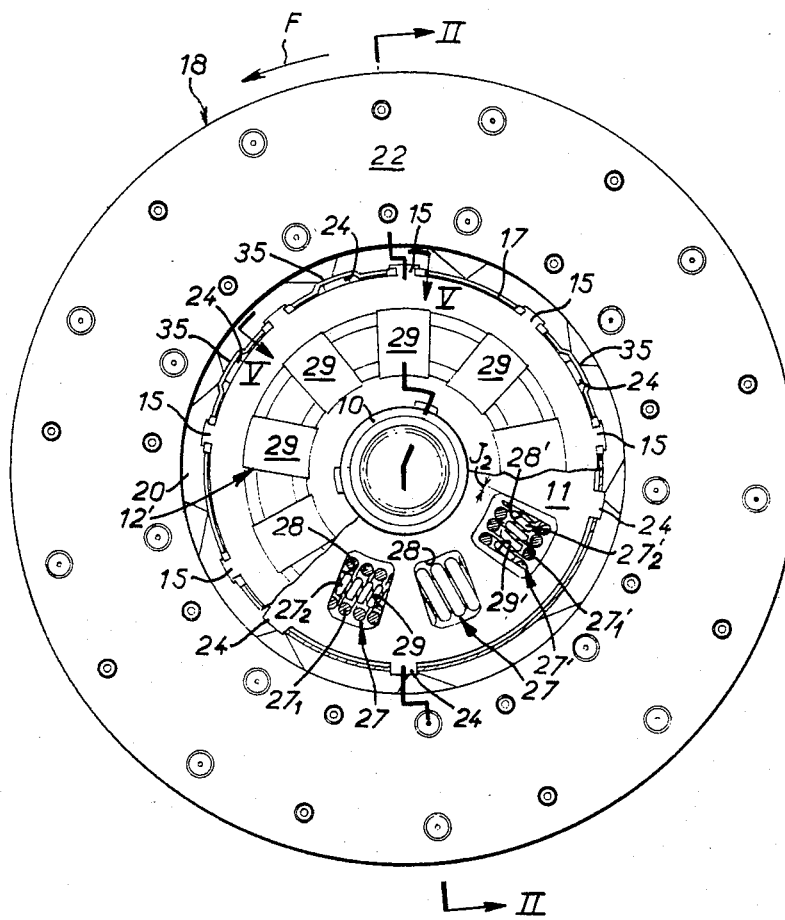
FIG. 1 shows an elevational view, with local cutaway portions, of a clutch plate assembly embodying the invention, taken in the direction of arrow I in FIG. 2.
Figure 2:
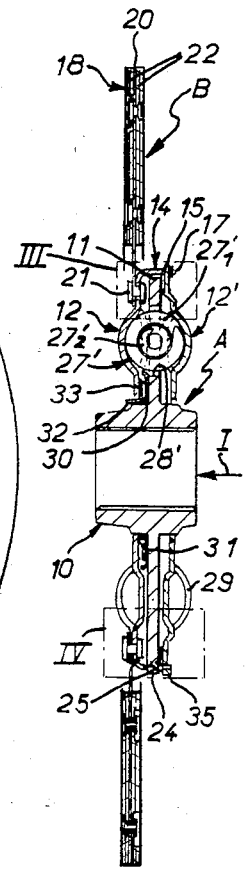
FIG. 2 shows a longitudinal sectional view of the clutch plate assembly taken along broken line II—II in FIG. 1.
Figure 3:
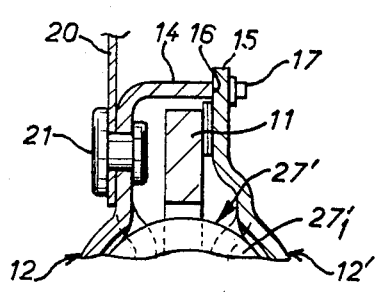
FIGS. 3 and 4 show, on an enlarged scale, detail views of the areas included in chain-line boxes III and IV in FIG. 2.
Figure 4:
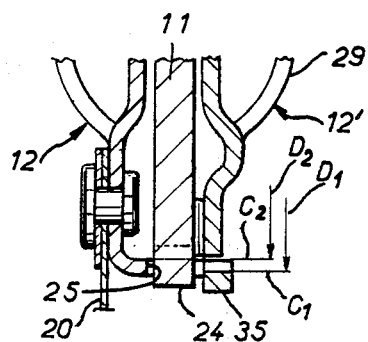

Generally speaking, and as shown in the drawings, the present clutch plate assembly, which is particularly intended for trucks and industrial vehicles, comprises two coaxial parts A, B rotatably mounted relative to each other within a predetermined range of angular displacement against the action of resilient means.

In practice, in the illustrated embodiment the coaxial part A comprises a hub 10 and a hub flange 11. The hub flange 11 is fixed to the hub 10. For example, as shown, it is formed in one piece with the hub 10 in a middle zone of the hub 10. In any event the hub 10 fixes part A for rotation with a first shaft, in practice the driven shaft, the bore of the hub 10 being spline mounted on such as shaft.

In the illustrated embodiment the coaxial part B comprises two annular guide members or washers 12, 12' disposed on axially opposite sides of the hub flange 11 and spaced therefrom. The annular guide members are suitably fixed to each other. An axial or cylindrical ring 14 is fixed to the first annular guide member 12 and is disposed radially outwardly of the hub flange 11 whereas the second annular guide member 12' has along its periphery circumferentially spaced radial tenons 15 which are engaged in notches 16 provided along the free edge 17 of the axial ring 14 in accordance with the arrangements disclosed in U.S. Pat. No. 4,223,776 which is incorporated herein by reference. In the illustrated embodiment there are nine tenons 15 having equal circumferential dimensions and being uniformly circumferentially spaced apart. The axial ring 14 has an equal number of complementary notches 16. Further, in the illustrated embodiment the axial ring 14 is formed in one piece with the first annular guide member 12. The combination of the first annular guide member 12 and the axial ring 14 is suitably blanked and stamped from the same piece of sheet metal.

The coaxial part B comprises a clutch plate designated generally by 18. The clutch plate 18 comprises a disc 20 which is circumferentially divided into segments and secured at its inner periphery by rivets 21 to the first annular guide member 12. The opposite sides of the disc 20 are fitted with friction facings or linings 22.

To fix the range of angular displacement between the coaxial parts A, B the hub flange 11 is provided along its outer periphery with circumferentially spaced radial lugs 24 normally received with clearances J1 in recesses 25 provided for this purpose in the axial ring 14. In the illustrated embodiment there are six lugs 24 on the hub flange 11 arranged in pairs. The pairs of lugs 24 are uniformly circumferentially spaced from one another and this is, likewise the case for the recesses 25 in axial ring 14. Further, in the illustrated embodiment, in the rest position of the assembly the clearance J1 is equal on either side of each lug 24 on the hub flange 11, FIG. 5, but this is not necessarily the case. On the contrary, the clearance may be different for one of the directions of relative rotation of the coaxial parts A, B compared to the other.

The resilient means acting against the relative rotation are disposed chordally between coaxial parts A, B and comprise, in the illustrated embodiment, coil springs 27, 27' lying along the same circumference of the assembly. In the illustrated embodiment there are six coil springs 27 arranged in pairs and three coil springs 27', the springs being in uniformly circumferentially spaced relation. The springs 27 are disposed in part in closed contour openings or windows 28 in the hub flange 11 and, in part, in housings 29 in the annular guide members 12, 12'. The housings 29 are alternately stamped in axially opposite directions in the guide members 12, 12' in register with one another.

In practice, the springs 27 are received without clearance in openings 28 in the hub flange 11 and housings 29 in the guide members 12, 12'. Similarly the springs 27' are arranged in part in closed contour openings 28' in the hub flange 11 and in part in housings 29' in the guide members 12, 12'. Although the springs 27, 27' are received without clearance in housings 29' in annular guide members 12, 12' circumference clearance J2 (FIG. 1) is provided for the rest position of the assembly between the circumferential ends of the springs 27' and the corresponding radial edges of the openings 28' in the hub flange 11. In the illustrated embodiment, as was the case for clearance J1 above, the clearance J2 has the same value in both directions of relative rotation of the coaxial part A, B. But as with the clearance J1 above, this arrangement is also not necessarily the case with clearance J2. In any event the circumferential clearance J2 is smaller than the clearance J1 in both directions of relative rotation of coaxial parts A, B. Moreover, in the illustrated embodiments the springs 27, 27' are double coaxial springs of identical lengths but different diameters $27_1$, $27_2$ and $27'_1$, $27'_2$.

In the illustrated embodiment friction means are provided axially between the coaxial parts A, B. The friction means comprises a friction washer 30 exerted against the hub flange 11 and carried by a support washer 31 fixed for rotation to the first guide member 12 by axial tabs 32. Such an axially acting spring washer 33 which is for example an Onduflex washer is interposed axially between the support washer 31 and the first guide member 12 and permanently urges the friction washer 30 into contact with the hub flange 11.

Such arrangements are well known per se and as they are not features of the present invention need not be described in greater detail herein.

Figure 6:
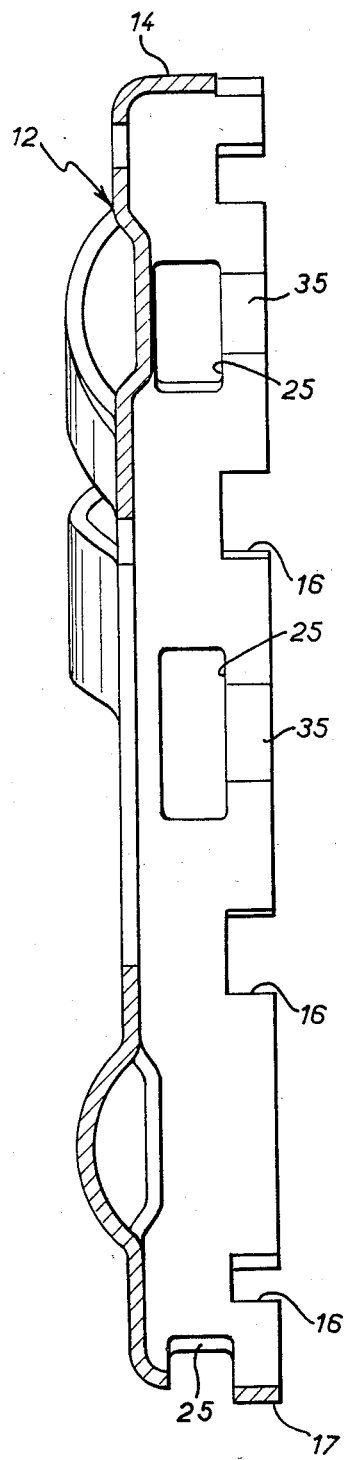
FIG. 6 shows, on a different scale, a longitudinal sectional view of the axial ring of the clutch plate assembly embodying the invention and the said first annular guide ring.

According to the invention, as is best shown in FIG. 6, the recesses 25 on the axial ring 14 for receiving lugs 24 on the hub flange 11 are circumferentially staggered or offset with respect to the notches 16 which are also provided in the axial ring 14 for receiving the tenons 15 on the second guide member 12'.

In other words, as best seen in FIG. 5, there is an angular or circumferential spacing between the radial planes extending through the middle of each recess 25 and the radial plane passing through the middle of each of the notches 16 circumferentially adjacent to such recess. And no recess 25 is provided in axial or circumferential alignment with any notch 16.

In the illustrated embodiment this arrangement is symmetrical: the same angular spacing E being provided between the radial plane passing through the middle of a recess 25 and each of the radial planes passing through the middle of the notches 16 circumferentially adjacent thereto. But such a symmetrical arrangement is not mandatory and on the contrary an asymmetrical arrangement is possible depending, notably, on the geometry of the assembly.

In any event each of the recesses 25 is in practice of closed contour. In the illustrated embodiment the free edge of the axial ring 14 on the side opposite the first guide member 12 which forms a rim portion 35 axially closes or limits the axial extent of the recess 25.

In practice, for the sake of facilitating assembly, as it will be brought out below, in axial alignment with the recesses 25 in the axial ring 14, the free edge 17 thereof extends at least locally along a circumference C1 having a diameter D1 greater than diameter D2 of circumference C2 for the remainder or main part of the axial ring 14, that part of the axial ring 14 forming the rim portion 25 being radially offset relative to the remainder of the axial ring 14.

In the embodiment shown in FIGS. 1–6, the free edge 17 of the axial ring 14 is radially offset relative to the remaining part of the axial ring only in circumferential alignment with the recesses 25 therein. In other words only the rim portion 35 closing off the recesses 25 is radially offset relative to the remainder of the axial ring 14.

Moreover, it will be noted that, as shown, each lug 24 is preferably located between two openings 28 or 28' in the hub flange 11 and not in radial alignment with the opening concerned.

In asssembly, coaxial part A is oriented slightly at an angle with respect to the first guide member 12 so that by slight shifting movements of the coaxial part A the lugs 24 on the hub flange 11 are radially engaged in the corresponding recesses 25 in the axial ring 14 on the first guide member 12. Alternatively, the radial offsetting of the rim portions 35 closing off the recesses 25 is sufficient for the coaxial part A to be engaged straight, that is, without any tilting thereof.

In operation, if a rotational torque is applied, for example, by the coaxial part B in the direction F in FIG. 1, this in turn drives coaxial part A. First the springs 27 come into action. After taking up the preloading of the springs in their housings, they yield elastically so that an angular displacement is produced between coaxial part B and coaxial part A in the direction of rotation of the entire assembly, as illustrated in the graph of FIG. 7 in which the angular displacement D is marked along the abscissa and the torque C along the ordinate axis.

For a value d1 of the angular displacement D corresponding to the taking up of circumferential clearance J2 springs 27' come into action after overcoming their preload by adding their force to that of springs 27. Finally, for a value d2 of angular displacement D corresponding to the taking up of circumferential clearance J1, the lugs 24 on the hub flange 11 come into contact with the corresponding edges of the recesses 25 in the axial ring 14 in which they are received. Thereupon there is a positive driving of coaxial part A by coaxial part B without the action of springs 27, 27' which nevertheless remain compressed. For this reason excessive torque may be transmitted from coaxial part B to coaxial part A. For a decreasing torque the steps are reversed. Further, such an operating mode is moreover well known per se and therefore need not be described in greater detail.

Figure 7:
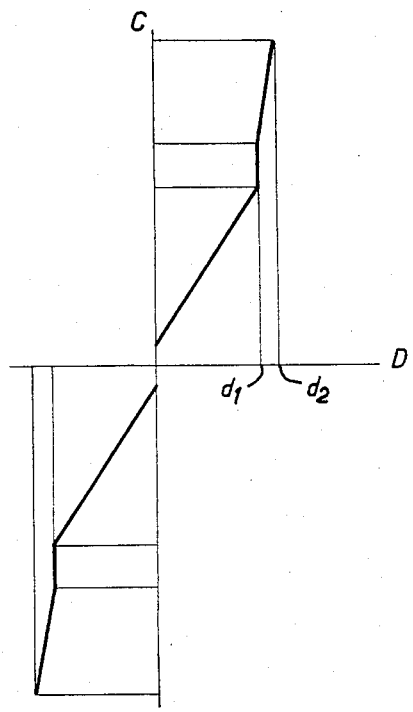
FIG. 7 shows a graph illustrating the operation of the clutch plate assembly according to the invention.
Figure 10:
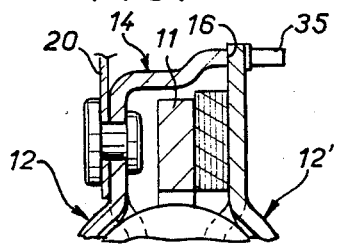
Figure 11:
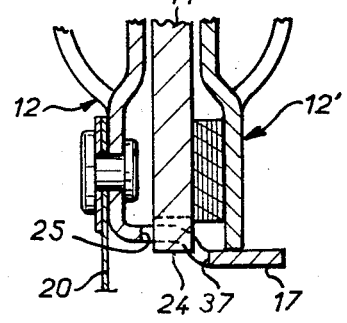

Of course, to simplify the graph of FIG. 7 the effects of hysteresis due to the friction washer 30 were not taken into account. As is known, the hysteresis effect produces for a given value of angular displacement a differentiation of the values of the torque for the direction of increasing torque relative to the direction of decreasing torque.

In the modified embodiment illustrated in FIGS. 8–11, the free edge 17 of the axial ring 14 is radially offset relative to the main part of the axial ring along the entire periphery thereof. In other words, the rim portions 35 for closing off the recesses 25 in the axial ring 14 are at the radial level of the entire edge 17.

During assembly, the positioning of coaxial part A relative to the first guide member 12 may also be carried out axially, the radial offset of the free edge 17 of the axial ring 14 being sufficient to permit the straight movement of the lugs 24 on the hub flange 11.

It will be noted that in the embodiment of FIGS. 8–11 the radially offset free edge 17 of the axial ring 14 is connected by a sloping zone 37 to the main part of the axial ring and the sloping connecting zone 37 extends at least at the radial level of the lugs 24 in the hub flange 11. In other words, during positive drive of coaxial part A by coaxial part B, each lug 24 on the hub flange 11 bears circumferentially against an axial portion and a sloping portion of the corresponding edge of the recess 25 through which the lug extends. Thus, the surface area on this edge against which the lug 24 bears is thus increased.

As a variant each lug 24 may bear entirely against a straight axial part of the edge of the recess 25 it extends through depending in particular on the axial thickness of the friction means used.

In the embodiment illustrated in FIGS. 8—11, as above, the radially offset free edge 17 of the axial ring 14 axially closes off or limits the recesses 25 therein. But this arrangement is not in this case mandatory, the axial delimitation of such a recess may, for example, be set back with respect to the free edge of the axial ring.

Finally, the present invention is not intended to be limited to the illustrated and described embodiments but encompasses all modifications and alternatives understood to those skilled in the art without departing from the spirit and scope of the present invention.

What is claimed is:

1. A clutch plate assembly for motor vehicles, said clutch plate assembly comprising two coaxial parts mounted for relative rotation within a predetermined range of angular displacement against the action of resilient means, one of said coaxial parts comprising a hub flange and the second coaxial part comprising two annular guide members disposed on axially opposite sides of the hub flange, and an axial ring fixed along one edge to the periphery of a first of said guide members in axially extending relation and having a free edge remote from said first guide member, said axial ring being disposed radially outwardly of said hub flange, the second of said guide members having circumferentially spaced tenons engaged and crimped in notches in said axial ring, said hub flange having along its periphery circumferentially spaced lugs normally received with clearance in recesses in said axial ring, the improvement wherein said recesses in said axial ring are circumferentially offset relative to said notches therein, axially extending portions of the free edge of said axial ring in axial alignment with said recesses lying along a circumference having a diameter greater than that part of said axial ring adjoining said first guide member, and said axially extending portions being spaced radially outwardly from said axial ring part.

2. The clutch plate assembly of claim 1, wherein only said axially extending portions of the free edge of said axial ring in axial alignment with said recesses lie along a circumference having a diameter greater than that of a remaining part of said axial ring and spaced radially outwardly therefrom.

3. The clutch plate assembly of claim 1, wherein said axially extending portions of said free edge of said axial ring axially close off said recesses.

4. The clutch plate assembly of claim 1, wherein said resilient means comprise springs disposed in part in openings in said hub flange and in part in housings in said annular guide members, each of said lugs on said hub flange being located between circumferentially adjacent openings therein.

5. The clutch plate of claim 1, and further comprising a friction disc, rivets fixing said friction disc to said first guide member.

6. A clutch plate assembly for motor vehicles, said clutch plate assembly comprising two coaxial parts mounted for relative rotation within a predetermined range of angular displacement against the action of resilient means, one of said coaxial parts comprising a hub flange and a second coaxial part comprising two annular guide members disposed on axially opposite sides of the hub flange, an axial ring fixed along one edge to the periphery of a first of said guide members in axially extending relation and having a free edge remote from said first guide member, said axial ring being disposed radially outwardly of said hub flange, the second of said guide members having circumferentially spaced tenons engaged and crimped in notches in said axial ring, said hub flange having along its periphery circumferentially spaced lugs normally received with clearance in recesses in said axial ring, the improvement wherein said recesses in said axial ring are circumferentially offset relative to said notches therein, all portions of said free edge of said axial ring disposed in axial alignment with said recesses lying along a circumference having a diameter greater than that part of said axial ring adjoining said first guide member and said free edge portions being spaced radially outwardly from said axial ring part.

7. The clutch plate assembly of claim 6, wherein a sloping connecting zone is provided between said axial ring part and said free edge thereof, at least part of said sloping connecting zone being in register with the lugs on said hub flange.

8. The clutch plate assembly of claim 7, wherein said free edge of said axial ring in circumferential alignment with said recesses axially closes off said recesses.

9. The clutch plate assembly of claim 6, wherein said resilient means comprise springs disposed in part in openings in said hub flange and in part in housings in said annular guide members, each of said lugs on said hub flange being located between circumferentially adjacent openings therein.

10. The clutch plate of claim 6, and further comprising a friction disc, rivets fixing said friction disc to said first guide member.

* * * * *